United States Patent [19]
Deck

[11] Patent Number: 5,402,234
[45] Date of Patent: Mar. 28, 1995

[54] METHOD AND APPARATUS FOR THE RAPID ACQUISITION OF DATA IN COHERENCE SCANNING INTERFEROMETRY

[75] Inventor: Leslie L. Deck, Middletown, Conn.

[73] Assignee: Zygo Corporation, Middlefield, Conn.

[21] Appl. No.: 11,963

[22] Filed: Feb. 1, 1993

Related U.S. Application Data

[63] Continuation-in-part of Ser. No. 937,591, Aug. 31, 1992, abandoned.

[51] Int. Cl.⁶ .......................... G01B 11/24; G01B 9/02
[52] U.S. Cl. ..................................... 356/357; 356/360
[58] Field of Search ................ 356/359, 360, 357, 358

[56] References Cited

U.S. PATENT DOCUMENTS

| | | | |
|---|---|---|---|
| 4,714,348 | 12/1987 | MaKosch | 356/351 |
| 4,732,483 | 3/1988 | Biegen | 356/351 |
| 4,818,110 | 4/1989 | Davidson | 356/358 |
| 4,869,593 | 9/1989 | Biegen | 356/359 |
| 4,978,219 | 12/1990 | Bessho | 356/349 |
| 5,061,071 | 10/1991 | Fujita et al. | 356/349 |
| 5,068,541 | 11/1991 | Kondo | 356/349 |
| 5,112,129 | 5/1992 | Davidson et al. | 356/359 |
| 5,122,648 | 6/1992 | Cohen et al. | 356/357 |
| 5,204,734 | 4/1993 | Cohen et al. | 356/359 |
| 5,210,591 | 5/1993 | DeGroot | 356/357 |

FOREIGN PATENT DOCUMENTS

| | | | |
|---|---|---|---|
| 1-282411 | 11/1989 | Japan | 356/349 |
| 2224367 | 5/1990 | United Kingdom | 356/359 |

OTHER PUBLICATIONS

Biegen et al., "High Resolution Phase Measuring Laser Interferometric Microscope for Engineering Surface Metrology", Surface Mesasurement & Characterization, vol. 1009, 1988.

Creath, "Step Height Measurement Using Two-Wavelength Phase Shifting Interferometry", Applied Optic, vol. 25, No. 14, Jul. 15, 1987.

Primary Examiner—Rolf Hille
Assistant Examiner—Minhloan Tran
Attorney, Agent, or Firm—Cohen, Pontani, Lieberman, Pavane

[57] ABSTRACT

A method of profiling a rough surface of an object includes the steps of producing an interference pattern of the object surface using an interferometer to produce an illumination intensity on the pixels of an imaging device, varying the optical path difference between the object surface and a reference surface of the interferometer through a range including a position of zero optical path difference for each pixel, calculating values of an interference discriminator function to identify the regions of coherence, gathering at the imaging device and storing for each pixel a plurality of intensity values about the region of coherence—as identified by the state or value of the interference discriminator function calculations—at consecutive data points spaced along the range by a predetermined phase difference, storing for each pixel the relative position of the plurality of intensity values along the range, and calculating from the stored intensity values the difference in height between two selected pixels using methods known in the art. An apparatus for practicing the invention is also disclosed.

35 Claims, 6 Drawing Sheets

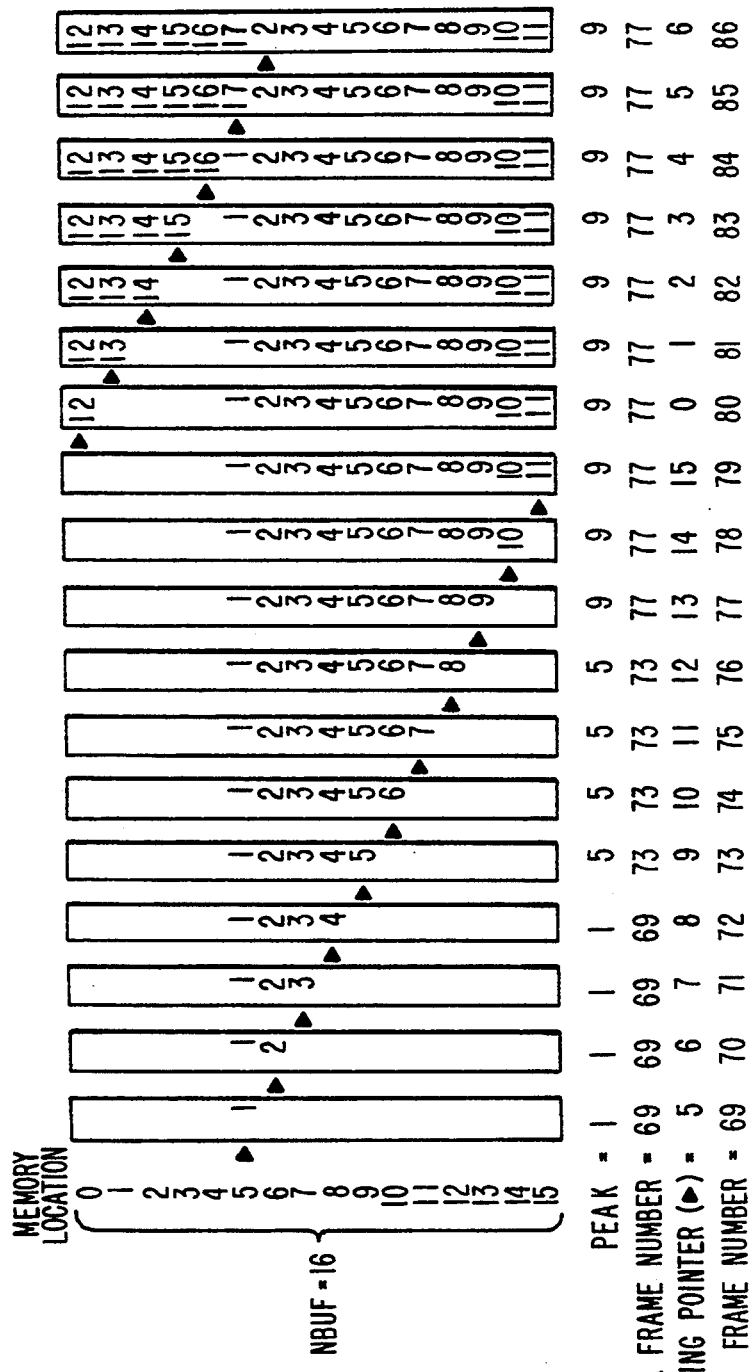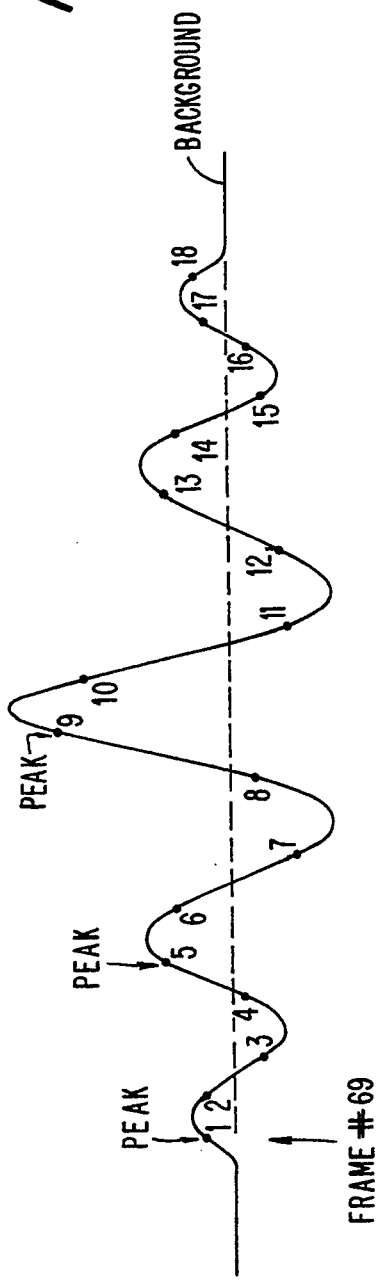
FIG. 4

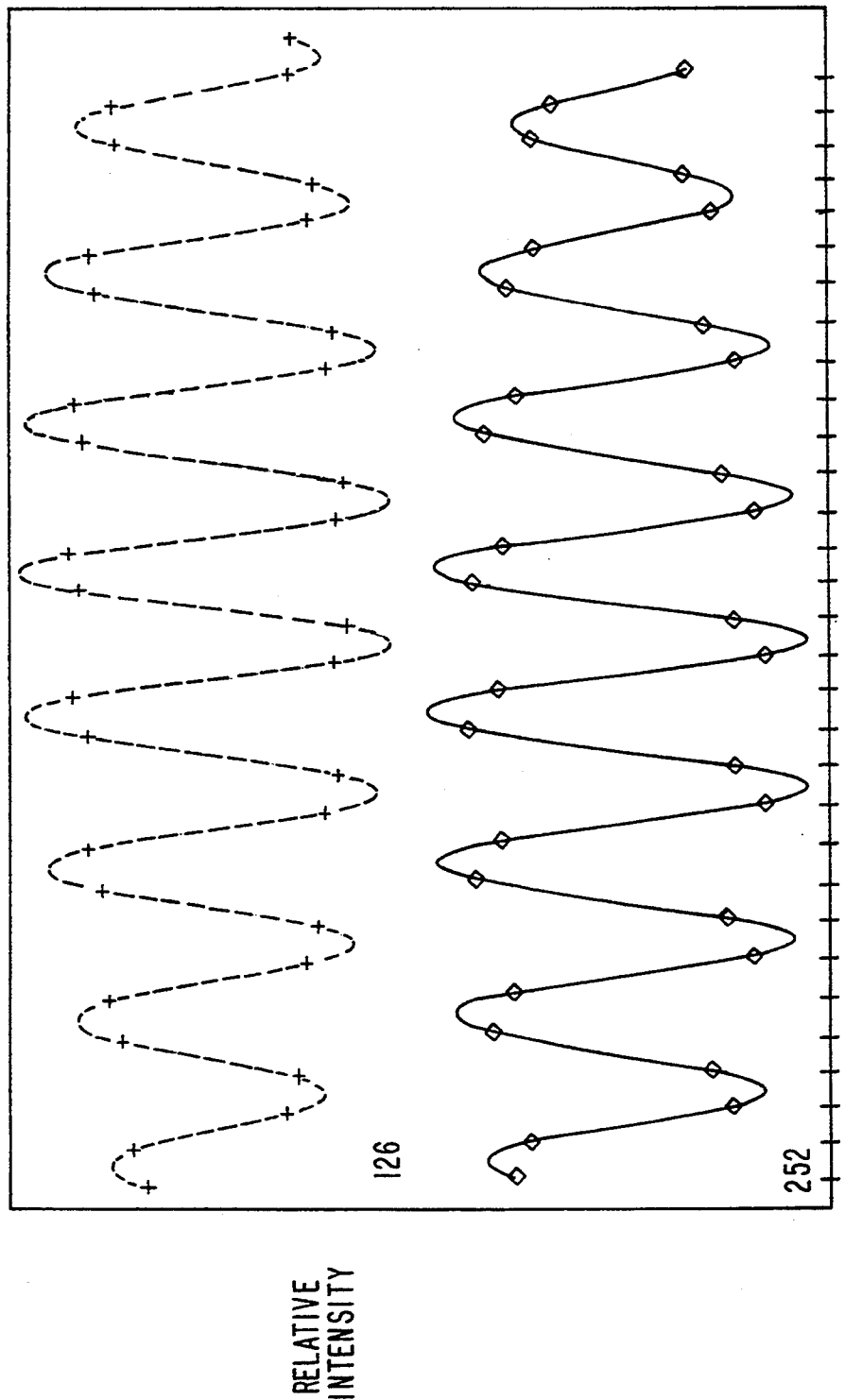

METHOD AND APPARATUS FOR THE RAPID ACQUISITION OF DATA IN COHERENCE SCANNING INTERFEROMETRY

CROSS-REFERENCE TO RELATED APPLICATION

This is a continuation-in-part of U.S. patent application Ser. No. 07/937,591, filed Aug. 31, 1992, now abandoned, the entire disclosure of which is incorporated by reference herein.

FIELD OF THE INVENTION

The present invention relates to precision optical metrology instrumentation and, more particularly, to methods and apparatus for the rapid acquisition of data in coherence scanning profilometry.

BACKGROUND OF THE INVENTION

Interferometric measurements using phase shifting techniques are presently capable of subnanometer resolution. A number of currently-available products are utilizing this technology to provide fast, non-contact, and highly repeatable profiles of object surfaces and topological features. See, for example, J. F. Biegen et at., "High-Resolution Phase-Measuring Laser Interferometric Microscope For Engineering Surface Metrology", 1 Surface Topography 469 (1988). It is well known, however, that because of phase ambiguities, surface features with relative height displacements or discontinuities that exceed $+\lambda/4$ between adjacent measurement sites are only determinable to a resolution of modulo $\lambda/2$, where $\lambda$ is the average wavelength of the illumination source.

A number of methods have been proposed and implemented to overcome this limitation in the topological profiling of such so-called rough surfaces. Among these are multiwavelength methods such as described by K. Creath, "Step Height Measurement Using Two-Wavelength Phase-Shifting Interferometry", 26 Appl. Opt. 2810 (1987), and by Y. Y. Cheng and J. C. Wyant, "Two-Wavelength Phase-Shifting Interferometry", 24 Appl. Opt. 804 (1985), coherence scanning methods such as described by G. S. Kino and S. S. C. Chim, "Mirau Correlation Microscope", 29 Appl. Opt. 3775 (1990), and by B. S. Lee and T. C. Strand, "Profilometry With A Coherence Scanning Microscope", 29 Appl. Opt. 3784 (1990), and order counting methods such as described by T. C. Strand and Y. Katzir, "Extended Unambiguous Range Interferometry", 26 Appl. Opt. 4274 (1987).

Multiwavelength schemes (see, for example, U.S. Pat. No. 4,832,489 to Wyant et al. and U.S. Pat. No. 5,127,731 to DeGroot) combine the measured phases from several illumination source wavelengths to produce a phase map corresponding to light of an equivalent wavelength. Thus, for two wavelengths $\lambda_1$ and $\lambda_2$, the equivalent wavelength $\lambda_{eq}$ is equal to:

$$\lambda_{eq} = \frac{\lambda_1 \lambda_2}{|\lambda_1 - \lambda_2|}$$

Ambiguities are thereby reduced by a factor of approximately $\lambda_{eq}/\lambda_1$. For very large steps, $\lambda_{eq}$ must be large and, accordingly, the range is limited by how close together the two wavelengths $\lambda_1$ and $\lambda_2$ can be made. This places stringent and, in some cases, effectively unattainable requirements on the necessary accuracy of the two wavelengths used, making this method difficult to implement or impractical for very large steps where typical interferometric precision of several angstroms (Å) is desired.

Coherence scanning methods—as for example disclosed in U.S. Pat. No. 4,340,306 to Balasubramanian, U.S. Pat. No. 4,818,110 to Davidson, and U.S. Pat. No. 5,112,129 to Davidson et al.—involve measuring the coherence envelope or fringe contrast from broadband light in an equal path interferometer while scanning through the equal path condition, or measuring the coherence envelope from narrow band light as is disclosed in copending U.S. patent application Ser. No. 07/893,324. The peak of the coherence envelope, corresponding to the maximum fringe contrast, is then determined as a function of scan or translation stage position. This peak contrast position will reflect changes in the heights of surface features and can thus be used to measure those features. Since the coherence envelope must be inferred from the interference fringes, it is however necessary to densely measure the fringes as a function of scan position. This requirement puts enormous demands on storage requirements for typical data, easily exceeding hundreds of megabytes. Thus, most implementations of coherence scanning perform some type of preprocessing; see, for example, P. J. Caber, "The Use Of Digital Signal Processing Techniques For The Interferometric Profiling Of Rough Surfaces", Masters Thesis in Electrical Engineering, University of Arizona (1991). Unfortunately, in addition to markedly increasing system cost, these procedures substantially reduce the rate at which data is taken, even when using high speed digital signal processors (DSP's) for the preprocessing functions. As a consequence, compromises between speed and data density are required and are typically made in most implementations of coherence scanning, thereby reducing the best available resolutions to the 10-20 angstrom range and scanning speeds to less than 0.5 μ/sec.

Order counting methods attempt to establish the order of the fringe used in the phase shifting calculation by using contrast information to identify the location of that fringe on the coherence envelope function. Broadband illumination is typically used so that the contrast between adjacent fringes changes sufficiently for a unique determination. The inherent limitation in such procedures is that sources which provide good fringe contrast discrimination have insufficient contrast for use with large steps, and sources which provide enough contrast for large steps lose discrimination for small steps.

Recently-issued U.S. Pat. No. 5,133,601 to Cohen et al. discloses several other related methods and arrangements for the profiling of rough surfaces. Common to each is on-the-fly computation and reconstruction, from the stored intensity data, of the modulation envelope waveform for each pixel so as to determine the derived peak intensity value of the central fringe of the envelope, which peak value is then used to determine the relative phase of the central fringe for each of a multiplicity of imaging pixels for use in calculating a step height. The need to compute the modulation waveform for each imaging pixel places significant computational and data storage requirements on the apparatus and notably slows the rate at which profiling of a surface may proceed and, correspondingly, may limit the attainable precision of the resulting profile measurements.

There is accordingly an unmet need, particularly for use with interferometric coherence scanning microscopes, for an inexpensive, fast and highly accurate method and apparatus for the rapid acquisition of data used in measuring the profiles of surfaces to a precision typically enjoyed by currently known and practiced interferometric methods and apparatus.

OBJECTS OF THE INVENTION

It is accordingly the desideratum of the present invention to provide a method and apparatus for the rapid acquisition of data for measuring topological surface profiles with high precision.

It is a particular object of the invention to provide such a method and apparatus for the rapid acquisition of data to measure rough surfaces or surfaces with large steps or slopes or other features having or including height differentials that exceed the dynamic range of conventional phase measuring interferometers.

It is another object of the invention to provide such a method and apparatus that enable the realization of this measurement capability very rapidly and inexpensively without requiring excessive computing resources, including computer memory and algorithm execution time, by acquiring data only in the regions of interest and by separating the data acquisition and analysis functions.

It is a further object of the invention to provide such a method and apparatus for the rapid acquisition of data so as to attain a measurement capability with precision typical of currently-known phase shifting interferometric methods.

SUMMARY OF THE INVENTION

The present invention provides a method and apparatus for the rapid acquisition of data for the purposes of profiling a surface of an object utilizing coherence scanning techniques. Briefly described, and in accordance with one embodiment thereof, the optical path difference between a reference and test surface of an interferometer is varied while the interferograms produced are imaged onto a solid-state imaging array. The sold-state imaging array is operated in conjunction with the variation of the optical path difference so as to obtain a plurality of interferograms at equally-spaced intervals such that the relative phase difference between successive interferograms is a known and repeatable quantity. For each pixel, an interference discriminator function value is calculated from the current and/or prior frame intensity data as an indication of the presence and approximate magnitude of interference. In one embodiment of the invention, the interference discriminator function is simply the rate of change of intensity, determined by measurement of the local intensity slope. In another embodiment, the inventive method exploits the known phase difference between successive data frames to provide an extremely simple yet effective interference discriminator function that measures the intensity difference between the most recently computed intensity and a running estimate of the intensity background. In still another embodiment, an estimate of contrast or modulation is computed and utilized as the interference discriminator function value.

Based on the calculated value or state of the interference discriminator function, a decision is made as to whether to store the current pixel intensity and/or the corresponding intensity data and the relative height or optical path difference. In one embodiment of the invention, the interference discriminator function value is compared to a predetermined threshold and a predetermined amount of consecutive intensity data is taken and stored once the threshold is exceeded. Relative height data is taken, once, at the point at which the predetermined threshold is exceeded. In another embodiment, a circular buffer scheme is implemented whereby a predetermined amount of consecutive intensity data, symmetrically disposed about the interference discriminator function peak, is taken. Relative height data and the interference discriminator function value are taken and stored whenever the most recently computed interference discriminator function value is greater than the value previously stored. The optical path difference is either incrementally or linearly varied through a selected distance, and the foregoing procedure is repeated until intensity data in the region of interference are obtained and stored for each pixel. The inventive apparatus and method then operates on this stored intensity and relative height data to produce a test surface height profile using, by way of example, standard techniques or formulae well known in the art. These techniques may include computing, from the stored intensity data, the modulation or contrast function and determining the peak of this function, amplitude demodulation techniques for extracting the modulation envelope from the intensity data and determining the peak thereof, and Fourier transform techniques commonly utilized in laser ranging applications.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 4 diagrammatically depicts a preferred sequential data frame acquisition and storage method and arrangement in accordance with the present invention, using a circular buffer memory to receive the data gathered for a single imaging device pixel during scanning through the equal path condition;

FIG. 6 graphically depicts intensity data obtained from two imaging device pixels during a typical scan through the equal path condition.

DETAILED DESCRIPTION OF THE PREFERRED EMBODIMENTS

Figure 1:
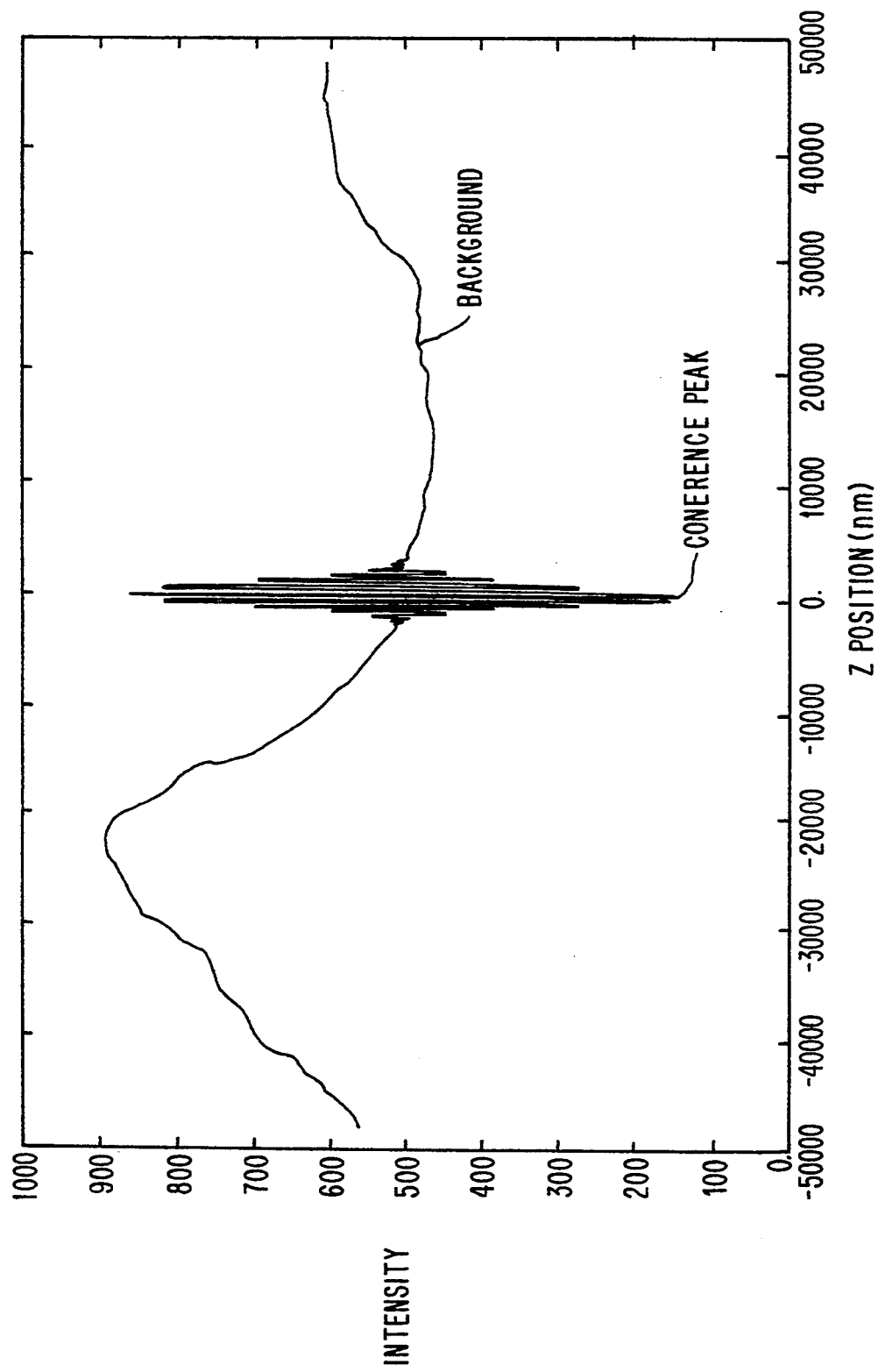
FIG. 1 graphically depicts typical data seen by a single imaging device pixel in a coherence scanning microscope when imaging a rough surface.

The present invention exploits a number of known facts and principles in a unique and heretofore unrecognized manner. It has long been understood that when short coherence length radiation is used in an equal path interferometer, interference fringes are localized around the equal path condition. This relationship is evident in FIG. 1 which graphically depicts the idealized intensity seen by a single detector pixel when imaging a rough surface with broadband illumination while linearly scanning along the z-axis over a 100 $\mu$ range. For a typical broadband source, the illumination spectrum encompasses many hundreds of nanometers and generates a sharply defined region of coherence only a few microns wide. The inventive method and apparatus first searches for and identifies this region of coherence. Pixel intensity data is then saved only in the area about the coherence peak, while the remainder of the data is ignored. This on-the-fly preprocessing function significantly reduces the data acquisition time, data storage and computational requirements and subsequent data processing time.

It is also well known that a smooth and constant velocity of z-axis movement can be far more readily attained with a linearly-movable translation stage than by incrementally positioning the stage to predetermined locations with nanometer precision. This latter fact, coupled with the highly accurate timebase of charge-coupled device (CCD) cameras, permits scanning with precise repetitive steps, by virtue of which the phase difference of the light or illumination between successive imaging frames is a known and readily repeatable quantity. The present invention utilizes an on-the-fly preprocessing technique that exploits the known phase separation between successive data-acquisition frames to provide an extremely simple and highly effective interference discriminator function that can be readily built into the apparatus electronics or coded into high speed microprocessors to provide real-time modulation discrimination for the data acquisition function.

The present invention differs from prior art coherence scanning methods in that it does not attempt to calculate the test surface profile on-the-fly by determining the position of the coherence envelope peak during the scan. Instead, it advantageously identifies and stores the data only in the area about the interference region, typically reducing the amount of data that must be processed for analysis by over an order of magnitude and thereby notably accelerating the measurement cycle time. This reduction in data storage and/or processing requirements through implementation of the present invention can perhaps best be appreciated through the following example. Consider a 100 $\mu$ scan, a 600 nm mean illumination wavelength, an 8-bit digitization precision per pixel, and a 60 Hz, 256$\times$256 pixel camera array for a total of 65536 pixels. If each frame is separated by 90 degrees of phase, the frame-to-frame z-axis spacing will be 75 nm, and 1333 frames will be required to cover the full 100 $\mu$ scan. At one byte per pixel, this example will require almost 87.4 Mb of storage, i.e. a data processing rate of almost 4 Mb/s, to keep pace in real time with the camera frame rate. If, on the other hand, data is stored (in accordance with the present invention) only within and in the area about 1.5 $\mu$ of the center of the interference region (i.e. 3 $\mu$ total peak width), then only 2.6 Mb of data storage will be required to retain all of the information necessary for a complete test surface profile measurement in accordance with the invention. This represents a decrease in storage requirements by more than a factor of 30, with a corresponding reduction in processing time and resources and a significant improvement in the speed of data acquisition.

The present invention also differs from known multi-wavelength phase shifting interferometer apparatus and methods in that it provides a simple and effective manner of determining the height difference between pixels whose phase difference exceeds one-half fringe, without the need for multiple wavelength acquisitions or well-defined and accurately-known source wavelengths. Unlike multi-wavelength schemes, the present invention is inherently nonambiguous for all topological step sizes.

The invention additionally differs from order counting methods in that the intrinsic limit to the measurable step height is independent of the source coherence properties.

Figure 2:
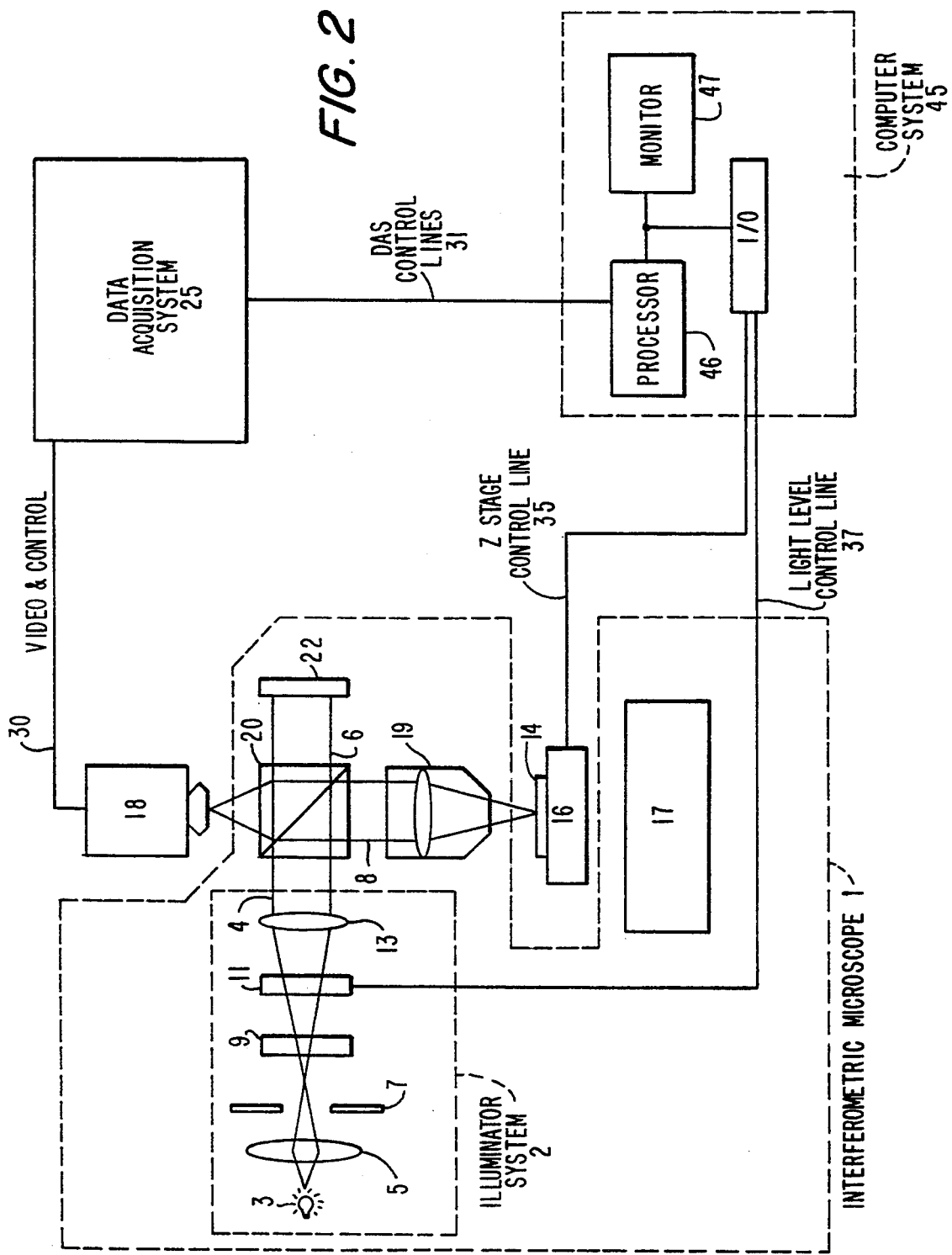
FIG. 2 is a diagrammatic representation of a preferred embodiment of an apparatus constructed in accordance with the teachings of the present invention and including the principle components of the apparatus.

The principle elements and components of an embodiment of an apparatus constructed in accordance with the teachings of the present invention, as incorporated into or used in conjunction with an interferometric microscope, are illustrated in FIG. 2. The interferometric microscope 1 includes an illumination subsystem 2, having a preferably broadband light source 3 of average wavelength $\lambda$, a condenser lens 5, a field stop 7, a spectral filter 9, a light level control element 11 such as a variable neutral density filter, and an optical system 13 for transferring the emitted light 4 into the optical axis of the interferometric microscope 1. The microscope further includes a coarse focus stage 17, an interferometer consisting of a beamsplitter 20 for splitting the source light 4 into a reference beam 6 and a test beam 8, a reference surface 22 of known topography, and an object having a surface or surface portion to be profiled, hereinafter referred to as the surface under test or test surface 14. Also provided as a part of the microscope 1 is an objective 19 for focusing the test beam 8 onto the test surface 14. In a currently preferred (but nonetheless illustrative) embodiment of the inventive apparatus, the interferometer and objective are combined using a commercially-available Mirau interferometric objective.

The inventive apparatus of FIG. 2 further includes an imaging array such as a charge-coupled device (CCD) camera 18 located at the back focus of the objective 19 for receiving and detecting or reading the interferometer data; a constant velocity z-axis translation stage 16 depicted, by way of example, in a configuration which translates the test leg of the interferometer, a data acquisition system (DAS) 25 for acquiring and storing the interference data, and a computer system 45 for analyzing the data and displaying calculated results. The computer system 45 variably controls the source light level through a light level control line 37, controls the constant velocity translation stage through translation stage control lines 35, and communicates with the data acquisition system 25 through DAS control lines 31. The DAS 25, in turn, controls the camera 18 and receives data from the camera by way of the video and control lines 30.

Figure 3:
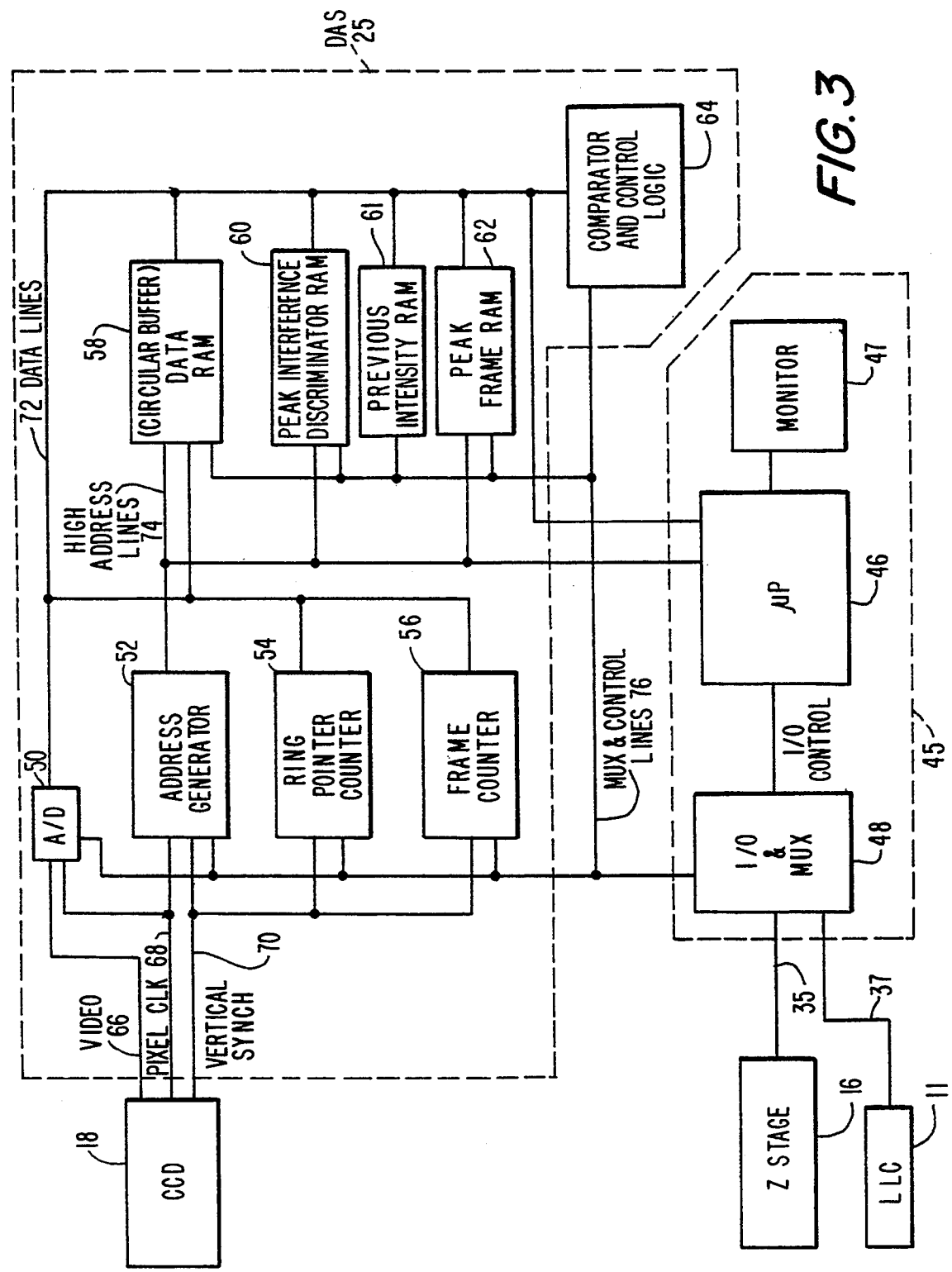
FIG. 3 is a block diagram of a preferred embodiment of the data acquisition and computer systems of the invention apparatus of FIG. 2.

The camera 18, DAS 25, constant velocity stage 16 and computer system 45 of the currently preferred embodiment are illustrated in further detail in FIG. 3. This arrangement of elements is operable, in accordance with the invention, for gathering or acquiring interference data symmetrically placed about the highest value of the interference discriminator function as the translation stage is axially scanned through the equal path condition. The DAS 25 includes an analog to digital (A/D) converter element 50 for digitizing the camera video output signal 66 as sampled at intervals controlled by pulses from the pixel clock signal 68, a frame counter 56 which incrementally tracks the frame number by using, for example, the vertical synch pulse 70, a frame memory 62 for storing the frame number corresponding to the last or most recently measured interference discriminator function peak for each pixel, a data memory 58 configured such that each pixel has a sequence of consecutive memory locations acting as a circular buffer of length NBUF for storing NBUF intensity values, per pixel, symmetrically placed about the last measured interference discriminator function peak, a ring pointer counter 54 which provides the low order addresses (i.e. the circular buffer addresses) and is incremented once per frame by, for example, the vertical synch pulse 70, an address generator 52 for supplying the high order addresses (i.e. the pixel addresses) and which is incremented once for each pixel by the pixel clock signal 68 and is zeroed for each new frame by the vertical synch pulse 70, a peak interference discriminator memory 60 for storing the last (i.e. most recent or current) interference discriminator function peak value, a previous intensity memory 61 of sufficient size for storing one or more previous intensity values for each pixel for use in the interference discriminator function calculations, and a controller element 64 incorporating a fast digital comparator for interference discriminator function peak detection, arithmetic logic for interference discriminator function calculations and controller logic for initiating frame number storage, intensity data storage, and peak interference discriminator function value storage as and when appropriate. Each of the memories 58, 60, 61 and 62 may, by way of example, be conveniently implemented using readily available random access memory (RAM).

A preferred embodiment of the present invention utilizes an interference discriminator or discriminator function that operatively exploits the known phase separation between successive dam-acquisition frames to provide an extremely simple yet unusually effective on-the-fly preprocessing arrangement and functionality. The interference discriminator function or algorithm can be readily implemented in high speed digital or analog electronics and/or coded into high speed computational processors so that storage decisions can be made rapidly and in real-time on a pixel-by-pixel basis. The intensity data waveform of FIG. 1 demonstrates the need for a discriminator or discriminator function that is sensitive only to the high frequency modulation associated with interference and effectively ignores the relatively low frequency background illumination resulting from test surface scatter and defocus. Although this background illumination is low frequency, it can have large amplitudes which may cause a purely amplitude-based discriminator, i.e. an intensity peak detector, to perform poorly on rough test surfaces. Thus, in its most preferred forms, the interference discriminator function operates to locate, in the pixel intensity data being received on a real-time basis, the region of high frequency signals which represents the region of interference and the location of the coherence peak. Toward this end, the present invention defines, for each pixel, a low pass filter which roughly follows the shape of the background illumination even during interference. The inventive method subtracts the filter's estimate of the current background illumination from the detected current pixel intensity to obtain an estimate of the interference amplitude. Data is then saved only in the region about the peak value of this interference discriminator function. It is important to recognize that the low pass filter need not be of high accuracy since it is only utilized to discriminate or locate the region of peak interference, and the analysis is capable of identifying most cases in which the data is not symmetrically placed about the interference discriminator function peak. In practice, for this first preferred embodiment—which produces a 90 degree phase difference between successive frames—an exceptionally effective notch filter is employed in lieu of a low pass filter. The notch filter function N(f) is defined by the average of the current pixel intensity and the intensity of that same pixel two frames prior to the current frame, i.e.:

$$N(f) = \frac{I_f + I_{f-2}}{2}$$

where $I_f$ and $I_{f-2}$ are the intensities seen by a particular pixel at frame numbers f and f-2, respectively. This notch filter relationship exploits the fact that pixel intensities separated by two frames are 180 degrees out of phase and are therefore insensitive to the frequencies produced by the interference illumination. Subtracting the notch filter function from the current frame intensity $I_f$ yields the relationship employed for implementing the interference discriminator function ID(f) in this first preferred embodiment of the invention:

$$ID(f) = I_f - I_{f-2}.$$

This extremely simple relationship provides all of the interference discrimination necessary for on-the-fly acquisition of pixel intensity data about, and only about, the coherence peak. As should be apparent, an overall factor of two in this relationship has been omitted, a permissible omission since only peak discriminator function values, rather than specific amplitudes, are required in the inventive method of dynamically locating and identifying the coherence peak.

Another embodiment of the present invention utilizes the local slope of the pixel intensity values to implement the interference discriminator. The interference discriminator function ID(f) in this case is defined by the relationship:

$$ID(f) = I_f - I_{f-1}$$

where $I_f$ and $I_{f-1}$ are the intensities seen by a particular pixel at consecutive frame numbers f and f-1, respectively. This second embodiment uses less memory at the cost of a small decrease in interference discriminator dynamic range and can be employed without modification irrespective of the inter-frame separation—i.e. the consecutive frame-to-frame separation is not limited to a 90 degree phase difference. Indeed, this concept may be further extended to an embodiment in which, by way of example, an inter-frame phase difference of 120 degrees is utilized, by employing an interference discriminator function ID(f) defined by the relationship $$ID(f) = 2I_f - I_{f-1} - I_{f-2}$$

where, as should now be apparent, $I_f$, $I_{f-1}$ and $I_{f-2}$ denote the intensities seen by a particular pixel at frame numbers f, f-1 and f-2, respectively. Analogous interference discriminator function relationships utilizing the measured intensity values, for a particular pixel, at the current frame and at a multiplicity of prior frames, may similarly be defined and employed.

Still another embodiment of the present invention utilizes simple thresholding of the interference discriminator to initiate data taking of the next NBUF consecutive intensity values for each pixel. Here, the interference discriminator function operates to identify regions of measured signal intensity greater than the estimated illumination background or noise. A suitable threshold value will generally be determined empirically and selected so as to assure that data taking is not triggered by the illumination background or noise. In this final disclosed embodiment, the peak interference discriminator memory 60 of FIG. 3 will not be required and the frame memory 62 will store, by way of example, the frame number at which the threshold is first exceeded.

With further reference to FIG. 3, the computer system 45 includes a microprocessor 46, one or more input-/output (I/O) elements 48 which buffer microprocessor control lines such as the translation stage control line 35, the light level control line 37 and DAS multiplexor and control lines 76, and a monitor 47 for displaying system status, measured data and calculated results. In the herein described methods and apparatus of the invention, the computer system 45 is not computationally active during data gathering or acquisition but, rather, initializes the DAS 25, sets up the ring pointer counter to count from zero (0) to NBUF, and controls the starting and stopping of the data acquisition sequence.

Data acquisition proceeds, by way of example, in the following manner. The operator enters into the computer system 45 parameters for controlling the measurement and data analysis sequences such, by way of illustration and not limitation, as scan length, number of scans, and type of processing algorithm to be employed. Using this information the computer system 45 calculates the appropriate translation stage speed, clears the frame memory 62 and peak contrast memory 60, sets the maximum count NBUF and zeros the ring pointer counter 54, zeros the address generator 52, zeros the frame counter 56 and generally initializes the DAS 25. The operator then positions the test surface 14, or a predetermined topological feature or portion of the test surface, in optical alignment with the camera 18, adjusts focus on the test surface using the coarse focusing adjustment stage 17 to assure that the feature of interest passes through focus during the scan, and initiates the measurement cycle via the keyboard or other appropriate I/O device of the computer system 45. The source illumination intensity is adjusted by the light level control element 11 so that the light intensity falling on each pixel of the camera 18 is within the dynamic range of the camera; a special or separate light level calibration scan may be necessary to assure that the adjustment is within the dynamic range as described hereinbelow. The microprocessor 46 then directs linear movement of the translation stage 16 at a constant velocity along the z-axis such that a predetermined distance is traveled during the interval between successive data-gathering camera frames.

A preferred embodiment of the inventive method will now be described. Assuming, by way of typical example, a 60 Hz camera, a mean light wavelength of 600 nm (i.e. 300 nm fringe spacing), and a standard 5-bucket data analysis algorithm, the z-axis translation speed would be set to 4.5 $\mu$/sec so as to provide a 75 nm spacing between adjacent-in-time data points, representing a 90 degree phase shift between successive data points or frames.

After the operator properly positions and focuses the test surface 14 and initiates the measurement cycle, the microprocessor 46 starts the calibration scan by commanding movement of the linear translation stage in one direction at the predetermined or calculated speed to produce a 90 degree, as is preferred, phase shift between successive frames. The output from each camera or imaging device pixel is then digitized by A/D converter element 50 and its value is compared, using controller logic element 64, to saturation as defined by a predetermined value. If saturated, the light level controller element 11 is instructed to reduce the light or illumination source intensity level. The new digitized intensity value is also compared to the corresponding value in data memory 60 which, for purposes of this light level setting scan only, holds the peak intensity measured at each pixel. If the newly-found intensity value is greater than the previously-saved value, then the current value is saved. It should be noted that the ring pointer counter 54 and the frame counter 56 are not incremented during this initial or light level calibration scan. After the maximum scan distance input by the operator has been traveled, further z-axis movement of the translation stage 16 is halted. The microprocessor 46 then checks the peak pointer memory 60 and data memory 58 for the maximum intensity value and adjusts the light level control element 11 to modify the light level, if and as needed, so that the maximum intensity measured is just below saturation. This light level is then locked in place. It should also be pointed out that under certain conditions of known test surface properties, the above-described calibration scan may not be necessary or may be performed manually.

The microprocessor 46 next zeros the address generator 52, clears the data memory 58, and operatively instructs reverse direction z-axis movement of the translation stage 16. The translation stage 16 then travels at a constant velocity such that a predetermined distance is traveled during each camera frame time. Most preferably, this velocity is identical to the translation velocity in the previous calibration or light level setting scan. During this second or reverse direction scan, the frame counter 56 and ring pointer counter 54 are each incremented by one for each successive camera frame.

Figure 5:
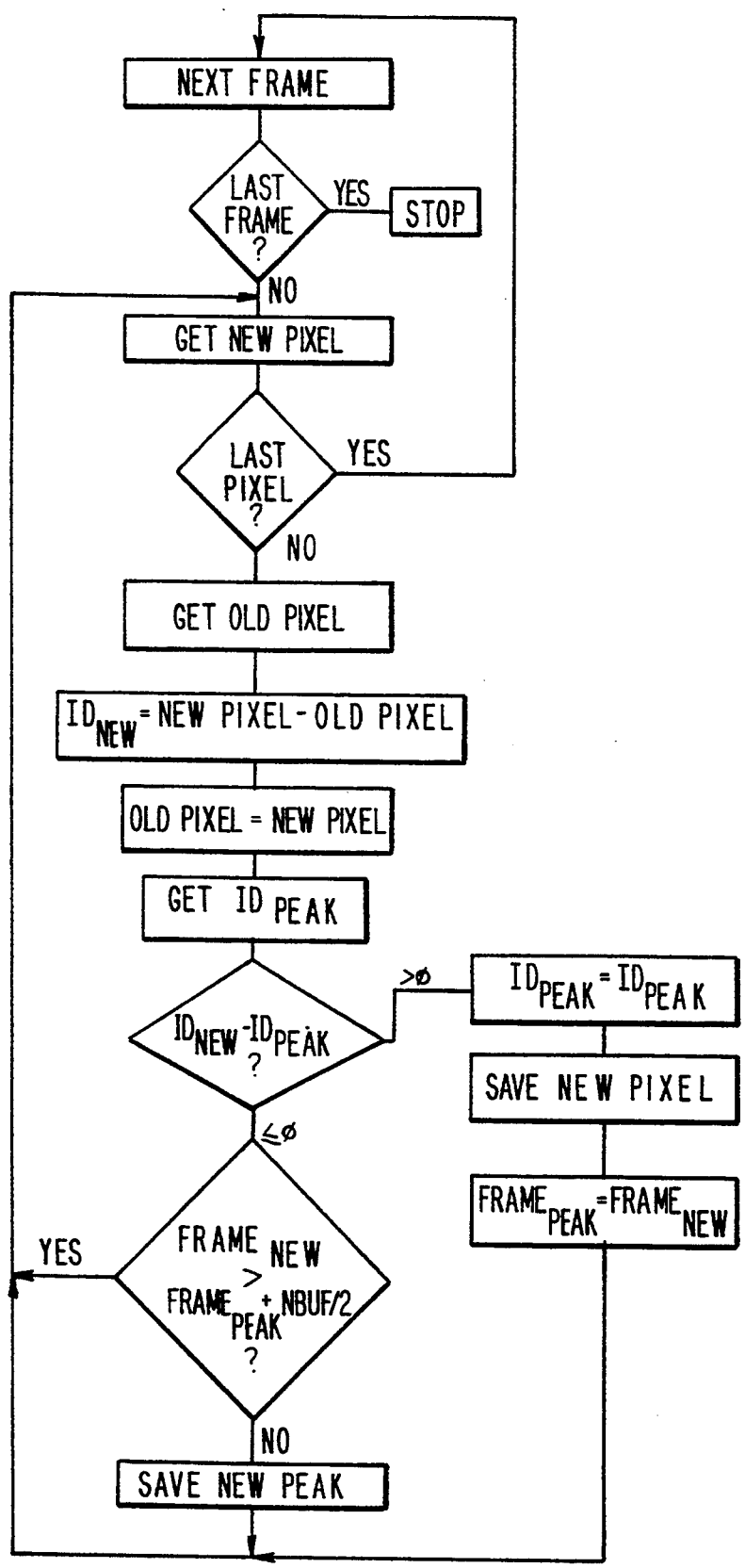
FIG. 5 is a flow diagram of a method for implementing a preferred embodiment of the circular buffer data acquisition and storage arrangement in accordance with the present invention.

Consider, by way of example—and with reference to the flow chart of FIG. 5—the events that take place at a particular frame number NFRAME utilizing the first above-described embodiment of the interference discriminator function. The ring pointer counter has a value NRING equal to NFRAME modulo NBUF. At pixel number NPIXEL, the address generator 52 produces address NPIXEL and the video line 66 is digitized at A/D element 50 to obtain the current intensity value for that pixel. The controller 64 retrieves, from previous intensity memory 61, the stored pixel intensity from frame NFRAME-2 and subtracts this value from the current frame intensity value to obtain the current value of the interference discriminator function. The controller 64 then replaces the intensity value from frame NFRAME-2 in the previous intensity memory 61 with the current frame intensity value. The current interference discriminator function value is then compared to the previous peak interference discriminator function value for that pixel as stored in the peak interference discriminator memory 60 at address NPIXEL and, if greater, the present value of the frame counter 56 is stored in peak frame memory 62, the current interference discriminator function value is stored in the peak interference discriminator memory 60, and the current frame intensity is stored in the data memory 58 at the location given by the address generator plus the current ring pointer counter (i.e. NPIXEL+NRING). If the new interference discriminator function value is less than the previous stored peak interference discriminator function value, and the difference between the current frame number and the frame number of the last stored peak is less than NBUF/2, then the current frame intensity value is stored in the data memory 58 at the location defined by the address generator plus the current ring pointer counter (i.e. NPIXEL+NRING). Otherwise, the current frame intensity value is ignored. As should be apparent, the frame number of the last peak interference discriminator function value is retrieved by accessing the contents of peak frame memory 62 at location NPIXEL.

FIG. 4 depicts the filling of the circular buffer 58 with digitized intensity values as the apparatus scans through the coherence peak, and shows the contents of various counters and memory elements after each frame. What should be immediately apparent is that in order to be assured that the circular buffer memory 58 will contain data before the main or central peak, secondary peaks must be present to trigger the data taking process before the main peak is encountered. This requirement is readily fulfilled by narrowing the spectral width of the illuminator bandpass filter 9. The narrower the spectral width, the longer the coherence length and the greater the number of interference fringes that will appear about the central fringe. If the spectral filter width is too narrow, on the other hand, the ability to distinguish the central fringe from the surrounding fringes will be effectively lost. The optimum filter width will be dependent on the digitization resolution and system noise but, in any event, filter widths of approximately 100 nm to 150 nm will provide sufficient modulation for most cases. Furthermore, the number of data points taken between successive interference peaks must be less than NBUF/2 to assure that no data is lost because the difference in frames exceeds NBUF/2 before the next interference fringe is encountered.

After a predetermined distance of linear z-axis travel, further movement of the translation stage 16 is halted. At this time the data memory 58 will contain a set of data points for each pixel. These data points will be contiguous (i.e. taken at successively contiguous camera frames) for each pixel, with equal fringe phase separation, and will straddle the coherence envelope approximately equally as shown in FIG. 6. The smooth sinusoidal curves in FIG. 6 represent the instantaneous intensity seen at two respective imaging device pixels, with the illustrated data points being the discrete scanned intensity data taken at 90 degree intervals; the number at the lower left of each FIG. 6 curve represents the frame number of the first data point in the series. For any given pixel, the frame number stored in peak frame memory 62 is associated with only one data point in the circular buffer memory 58. The position of this data point in the circular buffer can be identified by calculating the stored peak frame value modulo NBUF. Those data points are used to associate each circular buffer with a particular z-axis position in the linear scan. The frame numbers for other intensity data points in the circular buffer are obtained by adding the point's offset relative to the peak interference discriminator function data point to the frame number of the peak interference discriminator function data point. Thus sufficient information is available to permit analysis of the stored data points and values using any suitable methods known in the art such, for example, as amplitude demodulation, modulation curve fitting, and Fourier transform techniques.

It should be pointed out that, as used in this specification and disclosure, and in the appended claims, the term "peak" is intended to be understood in a broad sense as referring to an extremum. Persons skilled in the pertinent arts will recognize that certain interferometer constructions can influence the phase of the central coherence peak to produce a minimum, rather than a maximum, interference discriminator function or contrast or intensity value as mentioned in the various embodiments described hereinabove. Alternatively in such cases, the method and apparatus may search for these extrema using an enlarged circular buffer of sufficient size (i.e. number of storage locations per pixel) to assure that sufficient data is gathered about the true extremum. The true extremum or "peak" can then be determined through post-processing of the data.

Furthermore, although the method and apparatus of the invention have been described in embodiments using a broadband source of illumination, as is generally preferred, a narrow band illumination source may also be alternatively employed, particularly when using an objective with a large numerical aperture. These and other modifications and variations are fully within the intended scope and contemplation of the invention.

Thus, while there have been shown and described and pointed out fundamental novel features of the invention as applied to several specific and preferred embodiments thereof, it will be understood that various omissions and substitutions and changes in the form and details of the disclosed invention may be made by those skilled in the art without departing from the spirit of the invention. It is expressly intended that all combinations of those elements and steps which perform substantially the same function in substantially the same way to achieve the same results are within the scope of the invention. It is the intention, therefore, to be limited only as indicated by the scope of the claims appended hereto.

What is claimed is:

1. A method of profiling a surface of an object, comprising the steps of:
    (a) positioning the object surface along an optical axis so that a predetermined feature of the object surface is optically aligned with an imaging array of an imaging device;
    (b) producing an interference pattern of the object surface by means of an interferometer and operating the imaging device to record said interference pattern;
    (c) varying the optical path difference between the object surface and a reference surface of the interferometer over a predetermined range including a position of zero optical path difference for each pixel of the imaging array;
    (d) operating the imaging array in conjunction with said varying of the optical path difference so as to receive, at each pixel of the imaging array, intensity values at equally spaced intervals defined by a predetermined phase difference between successive images taken along the varying optical path difference;

(e) applying the intensity values received by each pixel to an interference discriminator for determining for each said pixel whether interference is present;

(f) storing for each said pixel a plurality of intensity values in a region of interference identified by the interference discriminator;

(g) storing concurrently with at least one of said stored intensity values for each said pixel the relative position along said predetermined range of said at least one stored intensity value; and (h) determining the height of said predetermined object surface feature by computing, using said stored intensity values and said stored relative position of each said pixel, the position along said range of zero optical path difference for said each pixel.

2. The method of claim 1, wherein said step (e) further comprises applying said received intensity values to the interference discriminator in real-time as said intensity values are received at the imaging device pixels so as to identify said interference region data on-the-fly, wherein said step (f) further comprises storing said plurality of intensity values in real-time as received at the imaging device pixels and identified by the interference discriminator as being located in said interference region, and wherein said step (g) further comprises storing said relative position of the at least one of said stored intensity values in real-time as said intensity values are received at the imaging device pixels and identified by the interference discriminator as being located in said interference region.

3. The method of claim 1, wherein said predetermined phase difference is 90 degrees.

4. The method of claim 3, wherein said step (e) comprises applying said received intensity values for each said pixel to an interference discriminator ID defined by the functional relationship $$ID(f) = I_f - I_{f-2}$$

where $I_f$ and $I_{f-2}$ denote the received intensity values for said pixel at data points f and f-2 of a series of consecutive data points f-2, f-1, f.

5. The method of claim 1, wherein said predetermined phase difference is 120 degrees.

6. The method of claim 5, wherein said step (e) comprises applying said received intensity values for each said pixel to an interference discriminator ID defined by the functional relationship $$ID(f) = 2I_f - I_{f-1} - I_{f-2}$$

where $I_f$, $I_{f-1}$ and $I_{f-2}$ denote the received intensity values for said pixel at respective data points f, f-1 and f-2 of a series of consecutive data points f-2, f-1, f.

7. The method of claim 1, wherein said step (e) comprises applying said received intensity values for each said pixel to an interference discriminator ID defined by the functional relationship $$ID(f) = I_f - I_{f-1}$$

where $I_f$ and $I_{f-1}$ denote the received intensity values for said pixel at data points f and f-1 of a series of consecutive data points f-1, f.

8. The method of claim 1, wherein said step (e) comprises applying said received intensity values for each said pixel to an interference discriminator comprising a high pass filter operable for identifying in said received intensity values data generated by background illumination.

9. The method of claim 1, wherein said step (e) comprises applying said received intensity values for each said pixel to an interference discriminator comprising a threshold detector.

10. The method of claim 1, wherein said step (f) comprises storing said plural received intensity values for each said pixel in a circular buffer having a predetermined plurality of storage locations for each said pixel.

11. A method of determining a height of a point on an object surface, comprising the steps of:

(a) positioning an object surface along an optical axis so that a predetermined point on the object surface is optically aligned with an imaging device;

(b) producing an interference pattern of the object surface location by means of an interferometer to produce an intensity value at a pixel of the imaging device;

(c) varying an optical path difference between the object surface and a reference surface of the interferometer through a predetermined range including a position of zero optical path difference for said point;

(d) receiving at said imaging device pixel, as the optical path difference is varied through said predetermined range, a plurality of intensity values of the interference pattern at randomly-selected consecutive data points spaced along said range by a predetermined phase difference;

(e) applying said received intensity values to an interference discriminator for identifying in said intensity values a region of high frequency interference data;

(f) storing a plurality of the received intensity values in the region of high frequency interference identified by said interference discriminator;

(g) storing concurrently with at least one of said stored intensity values the relative position along said predetermined range of said at least one stored intensity value; and (h) determining the height of said predetermined object surface location by calculating, using said stored intensity values and said stored relative position, the position along said range of zero optical path difference for said point.

12. The method of claim 11, wherein said step (e) further comprises applying said received intensity values to the interference discriminator in real-time as said intensity values are received at the imaging device pixel so as to identify said region of high frequency interference data on-the-fly, and said step (f) further comprises storing said plurality of intensity values in real-time as received at the imaging device pixel and identified by the interference discriminator as being located in said region of high frequency interference.

13. The method of claim 11, wherein said predetermined phase difference is 90 degrees.

14. The method of claim 13, wherein said step (e) comprises applying said received intensity values to an interference discriminator ID defined by the functional relationship $$ID(f) = I_f - I_{f-2}$$

where $I_f$ and $I_{f-2}$ denote the received intensity values for said pixel at data points f and f-2 of a series of consecutive data points f-2, f-1, f.

15. The method of claim 11, wherein said predetermined phase difference is 120 degrees and said step (e) comprises applying said received intensity values to an interference discriminator ID defined by the functional relationship $$ID(f) = 2I_f - I_{f-1} - I_{f-2}$$

where $I_f$, $I_{f-1}$, and $I_{f-2}$ denote the received intensity values for said pixel at respective data points f, f-1 and f-2 of a series of consecutive data points f-2, f-1, f.

16. The method of claim 11, wherein said step (e) comprises applying said received intensity values to an interference discriminator ID defined by the functional relationship $$ID(f) = I_f - I_{f-1}$$

where $I_f$ and $I_{f-1}$ denote the received intensity values for said pixel at data points f and f-1 of a series of consecutive data points f-1, f.

17. The method of claim 11, wherein said step (e) comprises applying said received intensity values to an interference discriminator comprising a high pass filter operable for identifying in said received intensity values data generated by background illumination.

18. The method of claim 11, wherein said step (e) comprises applying said received intensity values to an interference discriminator comprising a threshold detector.

19. The method of claim 11, wherein said step (f) comprises storing said plural received intensity values in a circular buffer having a predetermined plurality of storage locations.

20. The method of claim 11, wherein said step (e) comprises applying the received intensity values to an interference discriminator which subtracts, from each received intensity value, an estimate of then-current background illumination to thereby provide an estimate of current interference amplitude at the current position of the varying optical path difference.

21. The method of claim 20, wherein said step (e) further comprises locating a peak value among said current interference amplitude estimates.

22. The method of claim 21, wherein said step (f) comprises storing a plurality of the received intensity values of the interference pattern at consecutive data points about said peak value located in said step (e).

23. A method of profiling a surface of an object, comprising the steps of:

(a) positioning an object along an optical axis so that a predetermined feature of the object surface is optically aligned with an imaging device;

(b) producing an interference pattern of the object surface by means of an interferometer and an illumination source to produce an intensity value on the imaging device for each pixel of an image of the object surface, each said pixel corresponding to a location on the object surface;

(c) varying an optical path difference between the object surface and a reference surface of the interferometer through a predetermined range including a position of zero optical path difference for each said location;

(d) receiving at each said pixel intensity data as the optical path difference is varied through said predetermined range;

(e) applying said received data for each said pixel to an interference discriminator operable for locating the presence of interference in said received data;

(f) storing for each said pixel a plurality of intensity values of the interference pattern, as located by the interference discriminator, at randomly-selected consecutive data points spaced along said predetermined range by a predetermined phase difference;

(g) storing, for each said pixel, concurrently with at least one of stored intensity values for said pixel the relative position along said predetermined range of said at least one stored intensity value; and (h) determining a difference in height between two selected locations on the object surface, said two selected locations corresponding to respective first and second imaging device pixels, by calculating for each of said first and second pixels, using said stored intensity values and stored relative position, the position along said range of zero optical path difference for the corresponding selected location.

24. The method of claim 23, wherein said step (h) comprises the steps of:

i. for each of said first and second pixels, calculating the position in said stored randomly-selected consecutive data points of the data point of zero optical path difference;

ii. calculating a difference between the relative positions along said predetermined range stored in said step (g) for said first and second pixels; and iii. calculating a relative height difference between the two selected pixel locations by applying the calculated results from steps (i) and (ii) above.

25. The method of claim 23, wherein said step (e) further comprises applying said received intensity values for each said pixel to the interference discriminator in real-time as said intensity values are received at the imaging device pixel so as to identify said region of high frequency interference data on-the-fly, and said step (f) further comprises storing said plurality of intensity values for each said pixel in real-time as received at the imaging device pixel and identified by the interference discriminator as being located in said region of high frequency interference.

26. The method of claim 23, wherein said predetermined phase difference is 90 degrees.

27. The method of claim 26, wherein said step (e) comprises applying said received intensity values for each said pixel to an interference discriminator ID defined by the functional relationship $$ID(f) = I_f - I_{f-2}$$

where $I_f$ and $I_{f-2}$ denote the received intensity values for said each pixel at data points f and f-2 of a series of consecutive data points f-2, f-1, f.

28. The method of claim 23, wherein said predetermined phase difference is 120 degrees and said step (e) comprises applying said received intensity values for each said pixel to an interference discriminator ID defined by the functional relationship $$ID(f) = 2I_f - I_{f-1} - I_{f-2}$$

where $I_f$, $I_{f-1}$ and $I_{f-2}$ denote the received intensity values for said each pixel at respective data points f, f-1 and f-2 of a series of consecutive data points f-2, f-1, f.

29. The method of claim 23, wherein said step (e) comprises applying said received intensity values for each said pixel to an interference discriminator ID defined by the functional relationship $$ID(f) = I_f - I_{f-1}$$

where $I_f$ and $I_{f-1}$ denote the received intensity values for said each pixel at data points f and f-1 of a series of consecutive data points f-1, f.

30. The method of claim 23, wherein said step (e) comprises applying said received intensity values for each said pixel to an interference discriminator comprising a high pass filter operable for identifying in said received intensity values for each said pixel data generated by background illumination.

31. The method of claim 23, wherein said step (e) comprises applying said received intensity values for each said pixel to an interference discriminator comprising a threshold detector.

32. The method of claim 23, wherein said step (f) comprises storing said plural received intensity values for each said pixel in a circular buffer having a predetermined plurality of storage locations for said each pixel.

33. The method of claim 23, wherein said step (e) comprises, for each said pixel, applying the received intensity values to an interference discriminator which subtracts, from each received intensity value, an estimate of then-current background illumination to thereby provide an estimate of current interference amplitude at the current position of the varying optical path difference.

34. The method of claim 33, wherein said step (e) further comprises, for each said pixel, locating a peak value among said current interference amplitude estimates.

35. The method of claim 34, wherein said step (f) comprises, for each said pixel, storing a plurality of the received intensity values of the interference pattern at consecutive data points about said peak value located in said step (e).

* * * * *